(12) United States Patent
Bray et al.

(10) Patent No.: US 8,689,870 B2
(45) Date of Patent: Apr. 8, 2014

(54) USE OF METHYLHYDROXYETHYL CELLULOSE AS CEMENT ADDITIVE

(75) Inventors: Windal Scott Bray, Cypress, TX (US); Andreas Brandl, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 400 days.

(21) Appl. No.: 13/090,111

(22) Filed: Apr. 19, 2011

(65) Prior Publication Data
US 2012/0267108 A1    Oct. 25, 2012

(51) Int. Cl.
*E21B 33/13* (2006.01)
*E21B 33/14* (2006.01)
*C04B 16/02* (2006.01)
*C09K 8/467* (2006.01)

(52) U.S. Cl.
USPC ........... 166/293; 106/730; 106/805; 106/823; 166/294; 507/214; 507/216; 507/269

(58) Field of Classification Search
None
See application file for complete search history.

(56) References Cited

U.S. PATENT DOCUMENTS

| | | | |
|---|---|---|---|
| 2,629,667 A | 2/1953 | Herman | |
| 3,465,825 A * | 9/1969 | Hook et al. | 166/293 |
| 4,240,840 A | 12/1980 | Downing et al. | |
| 4,784,693 A | 11/1988 | Kirkland et al. | |
| 7,631,541 B2 | 12/2009 | Waugh et al. | |
| 2005/0139130 A1* | 6/2005 | Partain, III et al. | 106/730 |
| 2006/0199742 A1 | 9/2006 | Wilhelmus | |
| 2007/0135312 A1* | 6/2007 | Melbouci | 507/214 |
| 2009/0044726 A1 | 2/2009 | Brouillette et al. | |
| 2009/0149353 A1 | 6/2009 | Dajani et al. | |

FOREIGN PATENT DOCUMENTS

| | | |
|---|---|---|
| FR | 993586 A | 11/1951 |
| WO | WO9916723 A | 4/1999 |

* cited by examiner

*Primary Examiner* — George Suchfield
(74) *Attorney, Agent, or Firm* — John Wilson Jones; Jones & Smith, LLP

(57) ABSTRACT

Methylhydroxyethyl cellulose may be used as an additive in cement slurries in the treatment of wells to prevent or reduce the occurrence of gas channeling. In addition to acting as a gas control additive, methylhydroxyethyl cellulose controls fluid loss, minimizes free fluid and stabilizes foam during cementing of the well.

15 Claims, 1 Drawing Sheet

USE OF METHYLHYDROXYETHYL CELLULOSE AS CEMENT ADDITIVE

FIELD OF THE INVENTION

This invention relates to the use of methylhydroxyethyl cellulose (MHEC) as an additive for cement compositions. The MHEC may be used as a multipurpose additive for use to prevent and/or control gas channeling, control fluid loss, minimize free fluid, improve slurry stability and/or stabilize foam.

BACKGROUND OF THE INVENTION

During construction of a well penetrating a subterranean formation, a rotary drill is typically used to bore through the subterranean formation to form a wellbore. Once the wellbore has been drilled, a pipe or casing is lowered into the wellbore. A cementitious slurry and a displacing fluid, such as a drilling mud or water, is pumped down the inside of the pipe or casing and back up the outside of the pipe or casing through the annular space between the exterior of the pipe or casing and the wellbore. The cementitious slurry is then allowed to set and harden.

A primary function of the cementing process is to restrict fluid movement between the subterranean formation and to bond and support the casing. In addition, the cement aids in protecting the casing from corrosion, preventing blowouts by quickly sealing formations, protecting the casing from shock loads in drilling deeper wells, sealing off lost circulation or thief zones and forming a plug in a well to be abandoned. Cementing operations further provide zonal isolation of the subterranean formation and help prevent sloughing or erosion of the wellbore. In addition to their use in oil gas wells, cementitious slurries may be used to cement pipes or casings within geothermal wells, water wells, injection wells, disposal wells and storage wells.

In addition to selectively isolating particular areas of the wellbore from other areas of the wellbore, cementitious slurries may further be used for other purposes. For instance, cements may be used in remedial operations to repair casing and/or to achieve formation isolation as well as in sealing off perforations, repairing casing leak/s (including leaks from damaged areas of the casing), plugging back or sealing off the lower section of a wellbore, etc.

Cementitious slurries for use in such applications contain hydraulically active cements which set and develop compressive strength due to a hydration reaction. Physical properties of the set cement relate to the x-ray amorphous structure of the calcium-silicate-hydrates formed during hydration. For example, conventional Portland cements form an interlocking network of, for example, tricalcium silicate, dicalcium silicate, tetracalcium aluminum ferrite hydrates, interspersed with calcium sulfate and calcium hydroxide crystals. These crystals interconnect to form an interlocking structure which provides both flexural strength and a degree of resiliency.

Gas channeling in a cement composition is a common problem in the oil and gas industry. When a cement slurry is first placed in the annulus of an oil or gas well, it is the hydraulic fluid that exerts hydrostatic pressure on the sides of the well. Initially the hydrostatic pressure of the cement composition is great enough to keep gases that are naturally occurring within the reservoir in situ. But as the slurry of cement composition sets, it goes through a transition stage changing from liquid to solid. During this transition stage, the cement composition exerts less and less hydrostatic pressure on the well. It is in this transition stage that the cement composition is susceptible to formation gas entering into the cement sheath. The gas entering into the cement sheath produces pathways filled with gas. As the cement hardens, the pathways become channels in the hardened cement composition. Channeling in a cement composition weakens the structure.

Another common problem in well cementing is the loss of liquid fluid from the cementitious slurry into porous low pressure zones in the formation surrounding the well annulus. Fluid (liquid and/or gas) loss is undesirable since it can result in dehydration of the cementitious slurry. In addition, it may cause the formation of thick filter cakes of cement solids. Such filter cakes may plug the wellbore. In addition, fluid loss can damage sensitive formations. Minimal fluid loss is desired therefore in order to provide better zonal isolation and to minimize formation damage by fluid invasion.

Controlling gas in light weight cements, especially at low temperatures, has also been an industry problem for a number of years because the additive systems that are generally used or employed are better suited for heavier or higher density cements.

Common additives used to control fluid loss and gas migration from the slurry to the porous permeable formation include hydroxyethyl cellulose (HEC), carboxymethylhydroxyethyl cellulose (CMHEC), acrylamidomethylpropane sulfonic acid (AMPS), polyethyleneimines, styrene butadiene rubber latexes and polyvinyl alcohol. Further, microparticulate additives, such as silica fume, may be used in combination with such additives to make the cement composition less permeable. Such materials work best, however, in cement compositions that have a high cement density and a low water to cement ratio. The lower the cement density and the higher water to cement ratio, the greater the quantity of water soluble or film-forming additives that are required to reduce gas migration to an acceptable level and keep channeling to a minimum. The lower the cement density, therefore, the greater the quantity of traditional additives that are required. This quantity increases to a point that is cost prohibitive for lower density cement compositions.

Alternative additives for controlling fluid loss and gas migration have therefore been sought.

SUMMARY OF THE INVENTION

Methylethylhydroxy cellulose (MHEC) may be used in the cementing of wells, including oil, gas, water, injection, disposal, storage and geothermal wells. The use of MHEC in cement slurries prevents and/or reduces the occurrence of gas channeling. In addition, MHEC controls fluid loss, minimizes free fluid, improves slurry stability, and stabilizes foam.

In an embodiment, MHEC is used in cement slurries as a gas control agent.

In one embodiment, MHEC is used in cement slurries as a free fluid control agent or extender for cementitious slurries of low density.

In another embodiment, MHEC is used in cement slurries as a foam stabilizer.

In another embodiment, MHEC is used in cement slurries to retard the effect on thickening times in the slurry.

In another embodiment, MHEC is used in cement slurries to impart multiple effects and thus serves as a multipurpose additive. As such, MHEC may replace several additives conventionally present in cement slurries. Optimum placement of a cementitious slurry into the wellbore may therefore be effectuated by use of a multipurpose additive such as MHEC in the cement slurry.

The MHEC may be added to a cement slurry in dry form, in dry form suspended in oil-based carrier fluids, or in dry form mixed in a water based medium.

The use of MHEC in cement slurries provides an economical design of cement systems reduces potential incompatibilities between combinations of additives in the cement slurry and simplifies operations in the field.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
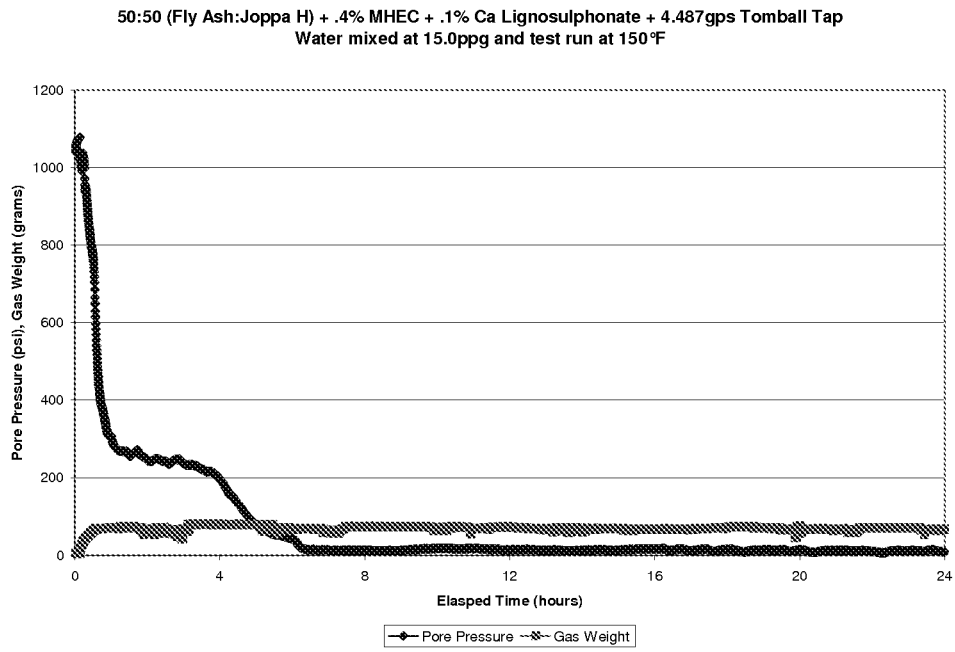
FIG. 1 is a graph showing the results of gas model testing for a cementitious slurry containing methylhydroxyethyl cellulose (MHEC)

MHEC may be used in a cement mix (1) to prevent the occurrence of gas-channeling and/or gas migration during cementing of a well; (2) as a density-reducing extender; (3) to control fluid loss, (4) to minimize or limit free fluid and improve slurry stability and/or (5) to stabilize foam within the cement slurry. For instance, MHEC has been found to control gas channeling, minimize free fluid, improve slurry stability and stabilize foam at temperatures up to about 180° F.

The cementitious slurries may have a density less than or equal to 17.0 pounds per gallon (ppg) and typically less than or equal to 15.0. In another embodiment, the cement slurry may an ultra low-density slurry, typically ranging from about 13.0 ppg to about 6.0 ppg or less.

Gas channeling occurs when the hydrostatic pressure exerted by the cement column decays to a pressure below the pore pressure of an oil or gas bearing reservoir. The pressure decay within the cement column is due to cement volume losses due to hydration and from fluid loss to permeable strata. These effects cause the cement to be self-supporting and therefore unable to transmit full fluid hydrostatic pressure. Gas migration can seriously compromise the hydraulic integrity of the cement sheath and can cause safety problems at the surface due to lack of zonal isolation. Gas channeling is reduced and/or minimized by use of MHEC in the cement mix.

As gas migration within a wellbore may occur in a variety of downhole pressure circumstances, it has been found that the density of the cement slurry may be reduced using MHEC. Reduction in cement slurry density is often required in order to place the slurry into the well without exceeding the formation fracture pressure. MHEC in the cement mix thus may function as a cement extender and aid in the lowering of the density of the slurry, thereby allowing for a lower density slurry to be used. MHEC allows for the addition of water without compromising the stability and free fluid control of the system.

MHEC further controls fluid loss which is important in controlling viscosity and thickening time of a cement composition. Fluid can be lost from cement compositions when the cement filtrate, the fluid phase of the cement composition, seeps into the permeable walls of a formation. When cement filtrate moves into the permeable walls, a layer of solids deposit on the wall. Under differential pressure, cement slurries lose filtrate to permeable formations. The loss of filtrate from the slurry can impact the ability to place the cement due to dehydration and subsequent viscosification of the slurry. Loss of fluid, either internally to hydration, or externally due to fluid loss, reduces the ability of the cement to transmit full hydrostatic pressure to a point where the cement becomes self-supporting and unable to control formation pore pressure. When this occurs, the cement is susceptible to the movement of gas or other fluids into the annulus between the casing and formation.

MHEC in the slurry minimizes free fluid, which improves slurry stability. Free fluid is water that separates from the cement composition after it is placed in the wellbore. Free fluid tends to migrate up within the cement column because the free fluid is less dense than the particles in the cement composition. Minimizing the free fluid in the cement composition makes the density of the top of the column of cement composition equal to that or close to that on the bottom so the column is homogeneous, whereas free fluid causes the column of cement composition to be light on top and very heavy on the bottom.

Supernatant water breakout is free fluid that has broken out of a cement slurry. Controlling supernatant water breakout of a slurry with MHEC thus limits possible pathways for formation fluids to penetrate through the cement sheath and cause channeling, especially under deviated conditions.

The presence of the MHEC in the slurry may further function as a stabilizer when a foaming agent and gas, such as nitrogen, are introduced to the cement. Such gases are sometimes added to a cement composition containing a surfactant or foaming agent to create a foam which reduces further the density of the system. The foam that is created is basically a series of bubbles in close proximity with one another. These materials tend to be unstable and coalesce into much larger bubbles and ultimately break out. MHEC stabilizes the foam, keeping the foam bubbles at about the same diameter and making a much more homogeneous foam.

Cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A-H" as listed in the API Spec 10, (1st ed., 1982), are suitable hydraulic cements. In addition, the cementitious material may include silica sand/flour and/or weighing agents including hematite or barite.

Mixing water is utilized with the dry cement composition to produce a fluid pumpable slurry of suitable consistency. API Spec 10, Second Edition, June 1984 which is known in the cement industry, describes an approved apparatus and method for measuring the consistency of cement slurries in terms of Bearden units of consistency (Bc). A pumpable slurry should measure in the range from about 2-20 Bc and preferably be in the range from about 5 to 11 Bc. Slurries thinner than about 5 Bc will tend to have greater particle settling and free fluid generation. Slurries thicker than about 20 Bc become increasingly difficult to mix and pump.

Depending upon the particular slurry and intended conditions of use, mixing water is utilized in the slurry of the present invention in the range from about 30 to 150 weight percent based upon the dry weight of cement and preferably is in the range of about 35 to 90 weight percent.

The cementitious slurry of the invention may further contain conventional additives used in the cementing of a gas or oil wellbore such as suspending or thixotropic agents, strength retrogression additives, permeability reducers, weighting materials, and anti-settling agents, etc.

The combination of the slurry and MHEC produces a slurry exhibiting low fluid loss, minimal free fluid, excellent solids support, and unexpected gas migration control. Low fluid loss is accomplished by establishing a low permeability filter cake in the presence of differential pressure against a permeable medium. Low fluid loss for a light weight cement is less than 500 cc per 30 minutes using the API fluid loss test. Low fluid loss for a cement having greater than about 14 pounds per gallon density is less than about 50 cc per 30 minutes using the API fluid loss test.

The determination of the amount of MHEC to add to a cement slurry to create the gas-tight design described herein can be based on the parameters of a particular well such as temperature and pressure. In an embodiment, from about 0.05 to about 1.50 percent by weight of cement (BWOC) of MHEC is used in the slurry.

A preferred amount of MHEC may be determined for the particular temperature and pressure parameters of a particular well by running a series of tests described and incorporated by reference herein. First, to produce gas-tight designs using the multi-functional additive of this invention, it is necessary to add sufficient additive to lower the API Fluid Loss to level below approximately 500 cm$^3$/30 min rate for a low density cement composition or approximately 50 cm$^3$/30 min rate for a high density cement composition. A test for determining the API Fluid Loss may be found in *API Recommended Practice 10B, Twenty-Second Edition*, December 1997, and is incorporated herein by reference.

Sufficient MHEC is also desirably added to minimize the free fluid content of the gas-tight design to below approximately 0.2 mL. A test for determining the free fluid content of a cement may be found in *API Recommended Practice 10B, Twenty-Second Edition*, December 1997 and is incorporated herein by reference. It is necessary to add a sufficient amount of additive such that the gas-tight design exhibits minimal sedimentation. A test for determining sedimentation may be found in *API Recommended Practice 10B, Twenty-Second Edition*, December 1997, and is incorporated herein by reference. For gas control designs, the maximum desirable density differential between the top sample and bottom sample, as described in *API Recommended Practice 10B, Twenty-Second Edition*, December 1997, should be no greater than 0.2 Lb/gal. Once it is determined that a particular amount of additive will result in: an API Fluid Loss level below approximately 500 cc/30 min rate; free fluid content of the gas-tight design to below approximately 0.2 mL, and a minimal sedimentation, gas flow model testing as described herein may be performed to determine the fluid loss, transition time, and permeability to resist gas intrusions.

The slurry may further contain a set retarder in order to delay the set time of the cement composition. Such set retarders are particularly useful when the cement composition is exposed to high subterranean temperatures. In addition to being capable of delaying the set time of the cement composition, the set retarder also functions to extend the time the cement composition remains pumpable after the cement composition is mixed and placed into the well. When present, the set retarder may be present in an amount between from about 0.1 to about 5 percent BWOC. Suitable set retarders include glucoheptonates, such as sodium glucoheptonate, calcium glucoheptonate and magnesium glucoheptonate; lignin sulfonates, such as sodium lignosulfonate and calcium sodium lignosulfonate; gluconic acids gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends.

MHEC (and optional cementing additives) may be added to cement compositions by any methods know to one of ordinary skill in the art. One preferred method to add the additive of this invention to cement is through liquid additive systems. Water based and oil based additives can be added to cement compositions by injecting or placing the additive into displacement tanks on a cementing unit. The additive may be allowed to fall into the mix water, disperse, and then be used to mix with cement. Another preferred method is to add dry form additives of this invention by dry blending them with the cement at a cement bulk facility. The blend of dry cement and additive can then used to form a slurry.

MHEC differs primarily from other commonly used additives because it controls annular gas. It may be used however strictly as a fluid loss additive or as an extender. For instance, MHEC may be used as a density reducing extender since it permits the use of a large amount of water thereby lowering the density of the cement composition. Further, MHEC may be used strictly to control fluid loss of the cement composition which is the integral part of any gas migration control phenomenon or process within the cement slurry composition. Since MHEC minimizes free fluid and improves slurry stability (important parameters in combating gas migration), it is particularly useful as a multipurpose cement. Its numerous functions all contribute to the ability to control gas migration. Adding extenders, fluid loss additives, and free fluid control agents separately is not required when using MHEC in the cement mix.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Examples 1-13

Cementitious slurries of desired density were prepared by mixing neat Joppa Class H Portland cement, optionally mixed with fly ash, with fresh tap water at room temperature. To the slurry was added methylhydroxyethyl cellulose (MHEC) and, optionally, sodium lignosulfonate ("SLS") as set retarder. (Comparative slurries were also prepared using, in place of MHEC, HEC from one of three suppliers.) The resultant slurry was kept agitated by occasional stirring. The free fluid content of the slurries was determined in accordance with procedures in *API Recommended Practice* 10B-2, *First Edition*, July 2005. The amount of fluid loss was determined at a designated temperature in accordance with procedures in *API Recommended Practice* 10B, *Twenty-Second Edition*, December 1997, incorporated herein by reference. Standard API viscosity reading readings were taken on a Fann 35 viscometer, at 120° F., 160° F. or 170° C. The results are tabulated in Table I:

TABLE I

| Example No. | Density [ppg] | Cement | Additive [BWOC] | SLS [BWOC] | Temperature [° F.] | Free fluid [ml] | Fluid loss [cc/30 min] | Rheologies 300/200/100/6/3 @ ° F. |
|---|---|---|---|---|---|---|---|---|
| 1 | 16.4 | Joppa H | MHEC, 0.3 | | 100 | 0 | 146 | |
| 2 (Comp. Ex.) | 16.4 | Joppa H | HEC-1, 0.3 | | 100 | 0 | 245 | |
| 3 | 12.6 | Joppa H | MHEC, 1.0 | | 120 | 0 | 28 | 147/110/68/8/4 @ 120 |
| 4 (Comp. Ex.) | 12.6 | Joppa H | HEC-1, 1.0 | | 120 | ~100 | 268 | 20/13/9/1/1 @ 120 |
| 5 (Comp. Ex.) | 12.6 | Joppa H | HEC-2, 1.0 | | 120 | 0 | 132 | 216/184/141/30/21 @ 120 |
| 6 (Comp. Ex.) | 12.6 | Joppa H | HEC-3, 1.0 | | 120 | 0 | 74 | 187/162/125/25/17 @ 120 |
| 7 | 12.6 | 50/50 FA/H (v/v) | MHEC, 1.0 | | 160 | slight trace | 22 | 133/105/72/25/22 @ 160 |
| 8 (Comp. Ex.) | 12.6 | 50/50 FA/H (v/v) | HEC-1, 1.0 | | 160 | 4 | 503 | 47/37/25/9/8 @ 160 |
| 9 (Comp. Ex.) | 12.6 | 50/50 FA/H (v/v) | HEC-2, 1.0 | | 160 | 0 | 150 | 253/205/144/31/24 @ 160 |
| 10 (Comp. Ex.) | 12.6 | 50/50 F/H (v/v) | HEC-3, 1.0 | | 160 | 0 | 106 | 250/205/146/30/22 @ 160 |
| 11 | 14.5 | 50/50 FA/H (v/v) | MHEC, 0.4 | 0.3 | 170 | 0 | 60 | 192/148/105/61/50 @ 170 |
| 12 (Comp. Ex.) | 14.5 | 50/50 FA/H (v/v) | HEC-1, 0.4 | 0.3 | 170 | ~50 | 418 | 30/22/15/1/1 @ 170 |
| 13 (Comp. Ex.) | 14.5 | 50/50 FA/H (v/v) | HEC-3, 0.4 | 0.3 | 170 | trace | 195 | 254/197/128/20/13 @ 170 |

Table I illustrates that improved results are obtained when MHEC is used in cement slurries. In particular, Table I establishes lower fluid loss with a MHEC containing cement slurry compared to the HEC containing cement slurry with minimal free fluid.

Examples 14-16

Cementitious slurries of 15.6 ppg density were prepared by mixing at room temperature 50/50 (v/v) fly ash/Joppa Cement H cement mix with fresh tap water. To the slurry was added 0.2% BWOC polynaphthalene sulfonate dispersant admixture (commercially available as CD-32 from Baker Hughes Incorporated) and 0.2 gallons per sac (gps) of an ammonium salt of ethoxylated alcohol sulfate foaming agent, commercially available as FAW-20 from Baker Hughes Incorporated. Further, to one slurry was added 0.2% BWOC MHEC and to another slurry was added 0.2% BWOC HEC. The stability of the foam was determined starting at a 15.6 ppg density and foamed down to 11.6 ppg. The results are shown in Table II. Further, the density of the cured cement was determined in a BP settling tube at 120° F. and the results shown in Table III, below. The tests were conducted in accordance with the protocol set forth in *API Recommended Practice* 10*B-2 and ISO* 10426-2.

TABLE II

| Foam stability test No | Additive [bwoc] | Temperature [° F.] | Stable foam at 11.6 ppg? | Homogenous density according to BP settling test |
|---|---|---|---|---|
| 14 | CD-32 0.2% FAW-20 0.2 gps | 120 | no | no |
| 15 | HEC-1 CD-32 0.2% FAW-20 0.2 gps | 120 | no | no |
| 16 | MHEC 0.2% CD-32 0.2% FAW-20 0.2 gps | 120 | yes | yes |

TABLE III

| | 14 | 15 | 16 |
|---|---|---|---|
| Top 9 | >8.34 | | 12 |
| 8 | >8.34 | 9.7 | 12 |
| 7 | >8.34 | 10.2 | 12 |
| 6 | >8.34 | 12.9 | 12.2 |
| 5 | 8.6 | 13.6 | 12.3 |
| 4 | 8.9 | 15.3 | 12.3 |
| 3 | 11.9 | 15.4 | 12.3 |
| 2 | 14.8 | 15.4 | 12.4 |
| Bottom 1 | 16.3 | 15.3 | 12.3 |

Examples 16-17

Cementitious slurries having a density of 15.0 ppg were prepared by mixing neat Joppa Class H Portland cement and fly ash (50:50 v/v) with fresh tap water at room temperature. To one slurry was added methylhydroxyethyl cellulose (MHEC) and to the second slurry was added hydroxyethyl cellulose (HEC). Sodium lignosulfonate ("SLS") as set retarder was further added to one of the slurries in accordance with Table IV below:

TABLE IV

| Ex. No. | MHEC, [BWOC] | HEC, [BWOC] | SLS, [BWOC] | Amt Water, gps |
|---|---|---|---|---|
| 16 | 0.4 | — | 0.1 | 4.487 |
| Comp. Ex. 17 | — | 0.8 | — | 4.536 |

Figure 2:
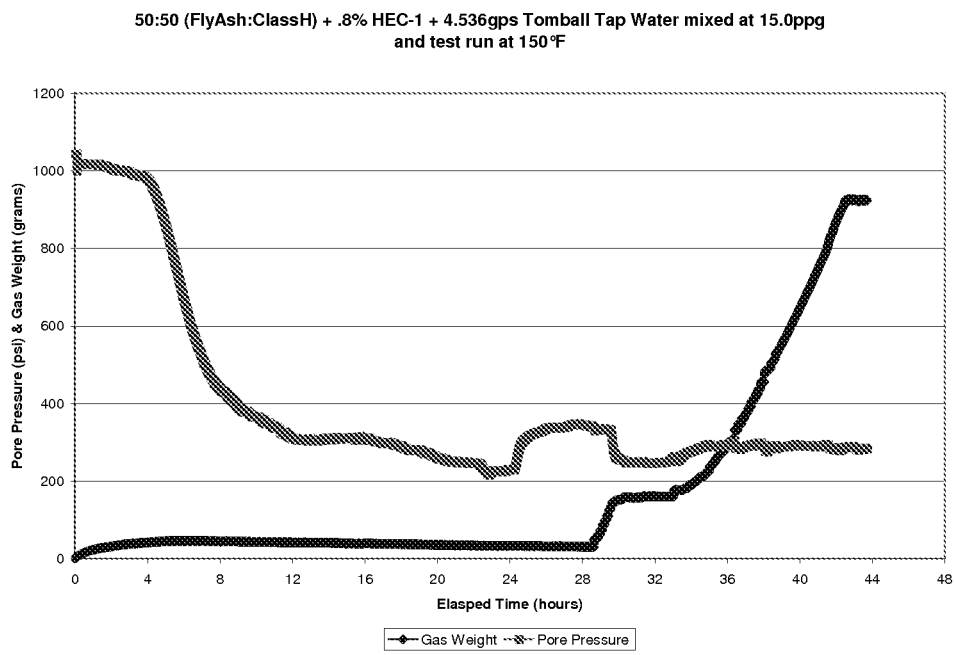
FIG. 2 is a graph showing the results of gas model testing for a cementitious slurry containing hydroxyethyl cellulose (HEC).

The gas volume and pore pressure of the cementitious slurries were determined over an extended period of time. These were determined by a Gasflow Model which was used to simulate the well configuration where the cemented annulus is between pressurized gas sand and a low pressure permeable zone. (In a typical well configuration where the cementitious slurry in the annulus between the casing and the formation, the cement is exposed to a highly permeable gas zone and a lower pressure permeable zone. Hydrostatic pressure on the unset cement keeps gas intrusion from occurring. During the cement hydration, the hydrostatic pressure is relieved and the cement pore pressure may decrease below the gas reservoir pressure and allow gas to intrude the cement column. The gas may penetrate to the well surface or to another lower pressurized permeable zone.) A 3 inch outside diameter by 10 inches long stainless steel cylinder contained the cementitious slurry. A (325/60) mesh stainless steel screen or a core was fitted at the bottom of the test cell. A back pressure regulator connected to the bottom assembly represented the lower pressure permeable zone. The top of the cylinder consisted of a head arrangement that allows for introduction of the pressure on top of the piston simulating hydrostatic pressure. Also, a traveling piston fitted with a 325 mesh screen or a core represented the high pressure formation. The Gas-flow Model is commercially available from Baker Hughes Incorporated as Part Number 51030-2. The pore pressure and gas weight of the slurry temperature of 150° F. were determined over a period of time and are demonstrated by the graphs shown in FIG. 1 (the slurry of Example 16) and FIG. 2 (the slurry of Comparative Example 17) wherein the gas volume is the amount of gas that enters the cell displacing the filtrate. For a successful test to take place, this volume must be less than the filtrate volume. The cement pore pressure is the pressure recorded by the transducer located on the side of the test cell. As the cement sets, it loses the ability to transmit measurable hydrostatic pressure to the transducer. As the cement sets the cement pore pressure falls. If gas communication through the cement column occurs, the cement pore pressure will rise after an initial decline. A continuously declining pore pressure indicates zero gas flow through the cement column. The Figures therefore demonstrate control of gas migration of the MHEC versus the HEC containing slurry.

From the foregoing, it will be observed that numerous variations and modifications may be effected without departing from the true spirit and scope of the novel concepts of the invention. It is intended that the specification, together with the examples, be considered exemplary only, with the scope and spirit of the invention being indicated by the claims which follow.

What is claimed is:

1. A method of cementing a pipe or casing in a gas well which comprises:
   (a) introducing into the gas well a cementitious slurry comprising methylhydroxyethyl cellulose (MHEC), wherein the MHEC is present in the cementitious slurry in an amount sufficient to reduce or prevent the occurrence of gas channeling in the wellbore during the cementing of the pipe or casing; and
   (b) allowing the slurry to harden to a solid mass.

2. The method of claim 1, wherein the density of the cementitious slurry is less than or equal to about 17 ppg.

3. The method of claim 2, wherein the density of the cementitious slurry is less than or equal to about 13.0 ppg.

4. The method of claim 1, wherein the amount of MHEC in the cementitious slurry is between from about 0.05 to about 1.50 percent by weight of cement.

5. The method of claim 1, wherein the amount of fluid loss of the cementitious slurry is less than about 500 cm$^3$/30 minutes, API Spec 10b.

6. The method of claim 1, wherein the amount of free fluid content of the cementitious slurry if less than or equal to about 0.2 mL, API Spec 10b.

7. A method for reducing the occurrence of gas channeling during the cementing of a well susceptible to gas channeling which comprises introducing into the well a cementitious slurry comprising Portland cement and methylethylhydroxy cellulose (MHEC) in an amount sufficient to reduce or prevent the occurrence of gas channeling in the well.

8. The method of claim 7, wherein the amount of MHEC in the cementitious slurry is between from about 0.05 to about 1.50 percent by weight of cement.

9. A method of cementing a pipe or casing in a wellbore which comprises:
   (a) introducing into the wellbore a cementitious slurry comprising methylhydroxyethyl cellulose (MHEC), a foaming agent and gas, wherein the MHEC is present in the cementitious slurry in an amount sufficient to reduce or prevent the occurrence of gas channeling in the wellbore during the cementing of the pipe or casing; and
   (b) allowing the slurry to harden to a solid mass.

10. The method of claim 9, wherein the amount of fluid loss of the cementitious slurry is less than about 500 cm$^3$/30 minutes, API Spec 10b.

11. The method of claim 9, wherein the amount of free fluid content of the cementitious slurry if less than or equal to about 0.2 mL, API Spec 10b.

12. The method of claim 9, wherein the density of the cementitious slurry is less than or equal to about 17 ppg.

13. The method of claim 12, wherein the density of the cementitious slurry is less than or equal to about 13.0 ppg.

14. The method of claim 9, wherein the amount of MHEC in the cementitious slurry is between from about 0.05 to about 1.50 percent by weight of cement.

15. The method of claim 9, wherein the cementitious slurry further comprises fly ash.

* * * * *